May 24, 1966 C. E. BELLINGER 3,253,047
STARTUP PROCEDURE FOR A HYDROGENATION SYSTEM
Filed Oct. 31, 1963
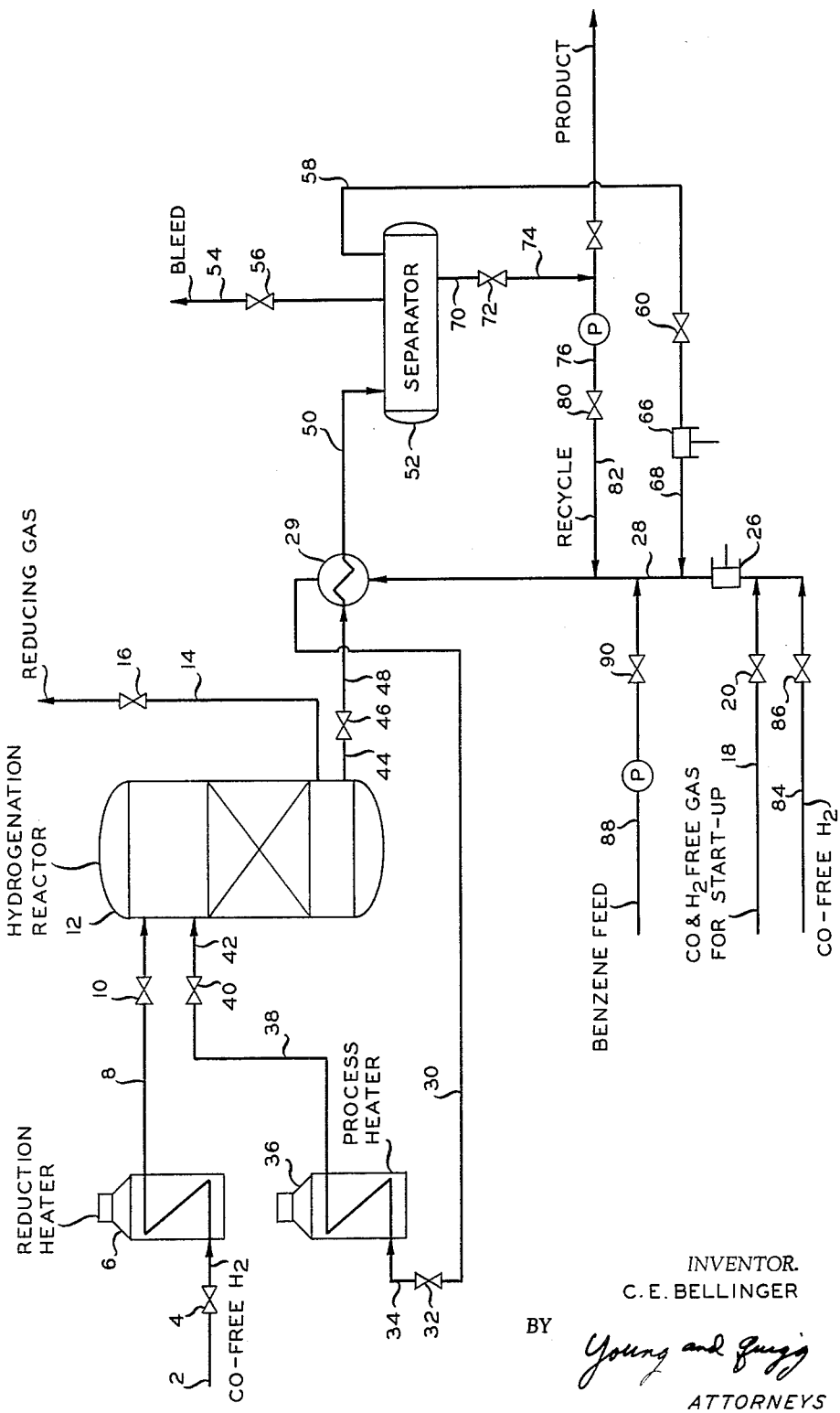
INVENTOR.
C. E. BELLINGER
BY
ATTORNEYS

United States Patent Office 3,253,047
Patented May 24, 1966

3,253,047
STARTUP PROCEDURE FOR A HYDROGENATION SYSTEM
Carnot E. Bellinger, Sweeny, Tex., assignor to Phillips Petroleum Company, a corporation of Delaware
Filed Oct. 31, 1963, Ser. No. 320,277
9 Claims. (Cl. 260—667)

This invention relates to a startup procedure for a hydrogenation system. In one aspect the invention relates to initiating a hydrogenation process. In another aspect the invention relates to a hydrogenation system employing a nickel on kieselguhr catalyst.

In the hydrogenation of unsaturated compounds, particularly the hydrogenation of aromatic hydrocarbons, for example benzene, metal catalysts are employed. These metal catalysts are usually received from the manufacturer as a metal oxide or other compound on a support such as kieselguhr. The metal oxide or other compound must be reduced, at least in part, to the metal before it is active for hydrogenation. This reduction step is frequently accomplished with the catalyst in place in the hydrogenation reactor, but before the reactor is placed on stream for hydrogenation. This reduction step is ordinarily carried out by employing a hydrogen-containing gas. The hydrogenation reactions employing the reduced nickel as a catalyst are subject to demethylation reactions during the startup operations. Since these demethylation reactions are extremely exothermic, temperature control is difficult during the startup process. Once in operation the temperature control can be effected by a variety of means, but during the startup procedure temperature control is extremely difficult.

It is an object of the invention to provide a novel hydrogenation process.

Yet another object of the invention is to provide a novel startup procedure for a hydrogenation process.

Another object of the invention is to provide a method for controlling the temperature of the hydrogenation reactor during startup.

These and other objects of the invention will be readily apparent to those skilled in the art from the accompanying disclosure, drawing and appended claims.

These objects are broadly accomplished in a process for hydrogenating a hydrogenatable material with a metal hydrogenation catalyst which has been reduced in a reaction zone with a hydrogen-containing gas by the improvement comprising removing said hydrogen-containing gas from said reactor and establishing hydrogenation conditions of temperature and pressure within said reactor in the absence of hydrogen, then introducing hydrogen and the hydrogenatable material thereto and recovering therefrom a hydrogenated product.

In one aspect of the invention the hydrogen-reducing gas is removed from the reactor by passing therethrough a hydrogen-free gas inactive for demethylation of a hydrocarbon over said catalyst.

In another embodiment of the invention, the hydrogen reducing gas is removed from the reactor by passing therethrough a CO- and hydrogen-free gas, increasing the pressure and temperature in the reactor with said gas and establishing temperature and pressure conditions within said reactor suitable for hydrogenation, introducing thereto recycle hydrogenation product, thereafter discontinuing the introduction of said CO- and hydrogen-free gas, then introducing hydrogen thereto and so as to purge said hydrogen-free gas from the system, then introducing the hydrogenatable hydrocarbon to the reactor and recovering a hydrogenated product.

The invention is applicable to any hydrogenation system employing any metal hydrogenation catalyst which has been reduced with hydrogen, such as a nickel on kieselguhr hydrogenation catalyst. However, the invention is particularly valuable when the reducing atmosphere comprises an impure hydrogen stream containing a minor proportion of at least one hydrocarbon material demethylizable at the temperature of the contacting. In this concept the impure hydrogen stream contains a minor portion of paraffinic hydrocarbons having from 2 to about 6 carbon atoms obtained as an off-gas from a reformer operation, although the paraffinic hydrocarbons can come from other sources such as a residue gas obtained from the cracking of light hydrocarbons and containing a small amount of olefinic hydrocarbons. By using, for catalyst reduction, the hydrogen with the minor proportion of paraffinic hydrocarbons, a steam diluent is not required and rapid demethylation of the ethane and heavier hydrocarbons in the hydrogen stream occurs due to the highly exothermic demethylation reaction. Thus, the heat of demethylation of the hydrocarbons present in the hydrogen stream is used along with the heat in the circulating stream to bring the catalyst bed to the desired reduction temperature. The quantity of demethylizable material employed in the hydrogen stream is regulated to control the rate of heating of the catalyst bed and generally up to about 12 mol percent demethylizable hydrocarbons, preferably 4 to 8 mol percent, is employed. If less than 2 mol percent based on ethane (realizing that propane, butane, pentane and hexane respectively, have about 2, 3, 4 and 5 times the heat produced by demethylization as compared to ethane) is used it is not necessary to dilute the reactivation process by recycle of the methane hydrogen process in the reactivation step; otherwise, recycle or diluent is required. When the demethylizable impurities are above about 2 mol percent, an inert gas, for example nitrogen, methane etc., can be utilized to dilute the reducing medium as a substitute for recycle operation.

When demethylizable hydrocarbons are present in the reaction system after activation of the catalyst, it is difficult by ordinary procedures to control the temperature of the reactor during the startup procedure. I have now found that if the startup procedure is initiated with a hydrogen-free (and CO-free) gas, such as a fuel gas containing principally methane, for the startup and for flushing or purging of the hydrogen-containing and demethylizable gas-containing reducing gas from the reactor, that the reaction is readily controlled since demethylation does not occur in the absence of hydrogen.

The invention is broadly applicable to any metal hydrogenation catalyst which is reduced with a reducing gas, either supported or unsupported. However, nickel-kieselguhr catalysts are preferred since they are quite active for the hydrogenation of aromatic hydrocarbons, especially benzene. Other active hydrogenation catalysts that can be reduced according to the invention include Raney nickel, finely divided platinum, finely divided palladium, chromium oxide and the like.

The catalysts and methods for their preparation are well known. In one suitable method the nickel-kieselguhr catalysts, which are preferred for the hydrogenation of benzene is prepared by saturating kieselguhr with a reducible nickel metal compound, such as nickel hydroxide, after which at least a portion of the nickel compound in the mixture is reduced to elemental nickel by contacting same with a stream of impure hydrogen. The activation temperature ranges from about 500 to about 750° F. or higher for these catalysts. The activated nickel-kieselguhr catalysts is in a state of high activity because such treatment reduces at least a part of the nickel compound to elemental nickel, generally 35 to 40 percent of the nickel being reduced, the reduced nickel content, however, sometimes varying from approximately 10 to 50 percent. The metal hydrogenation catalysts can be on other supports such as silica gel, alumina, and other known hydrogenation catalyst supports.

As indicated above, the metal hydrogenation catalysts, and particularly nickel-kieselguhr catalysts, are effective for the hydrogenation of aromatic hydrocarbons to saturated hydrocarbons, particularly the convention of benzene to cyclohexane. Ordinarily, the hydrogenation reaction is carried out at a temperature in the range 200 to 600° F. and at a pressure ranging from 300 to 600 p.s.i.g.

According to the method of the invention the reaction is initiated in the absence of hydrogen and in the absence of carbon monoxide. In addition to removing all of the hydrogen from the system during the startup procedure it is also most advisable that the startup gas be CO-free. After the hydrogen has been purged from the system, the system is pressured with the CO- and hydrogen-free gas, and this gas is circulated by way of heaters to warm the reactor beds to near the operating temperature. Hydrogenated product from storage or other source is circulated at a rate sufficiently high to control the temperatures at the desired levels. After proper process conditions and hydrocarbon flow and established, CO- and hydrogen-free gas is purged from the system with normal hydrogen makeup. As soon as the system is purged, hydrogen and recycle hydrogenated product are circulated in normal amounts and the raw unhydrogenated feed, for example benzene, is added to the system. The unit is then on stream and normal temperature control operations can be exercised.

The CO- and hydrogen-free gas may be any inert gas free of hydrogen and CO and preferably free of hydrogen sulfide since both CO and hydrogen sulfide are detrimental to the nickel-kieselguhr type catalyst. Nitrogen or and other inert gas are also employable as a startup gas although a fuel gas which is principally methane is usually economically advantageous. Most plants have a source of hydrogen free gas. If none is available, then gas containing $C_2$ to $C_5$ aliphatic hydrocarbons, such as ethane, propane, butane, isobutane and pentanes or mixtures thereof, can be employed for the startup procedure so long as they are hydrogen-free.

The invention is best described by reference to the accompanying drawing which is a flow diagram of a suitable process for the reduction of the hydrogenation catalyst in the startup of the hydrogenation process according to the method of the invention.

For simplicity the invention will be described with reference to the hydrogenation of benzene to cyclohexane employing a nickel-kieselguhr catalyst. A CO-free hydrogen-containing gas, which may also contain demethylizable hydrocarbons, to produce extra heat due to its exothermic reaction as heretofore explained, is introduced into the system through conduits 2 and 4 and passed into a reduction heater 6 wherein the temperature is elevated to 500 to 750° F. The hot hydrogen-containing reducing gas is then passed through conduits 8 and valve 10 into reactor 12 containing a bed of the hydrogenation catalyst. The reducing gas is then vented through conduit 14 and valve 16 to the atmosphere, or to any other use desired. Preferably upon completion of the reduction of the catalyst with the hydrogen-containing gas the bed is cooled with the reducing gas to at least 400° F., usually in the range of 200 to 300° F. The hydrogen flow 2 is then discontinued. Preferably, the operating system is then shut down and depressured substantially removing all hydrogen from the system. The reactor is then lined up in the hydrogenation process system and the spent reactor is removed from the process.

After the catalyst bed has been activated, the hydrogen-containing gas is removed from the system by the method of this invention wherein a CO- and hydrogen-free gas is introduced through conduit 18, valve 20, compressor 26, conduit 28 and passed through a heat exchange means 29 in communication with the effluent from the hydrogenation reactor, then through conduit 30, valve 32, conduit 34 and a process heater 36 wherein the startup gas is elevated in temperature to about the hydrogenation operating conditions.

This gas is introduced through conduit 38 and valve 40 and passed through the bed of activated catalyst in the reactor 12 for purging of the hydrogen-containing gas and to reheat the catalyst bed. This hydrogen-containing gas and the startup gas admixture is then passed through conduit 44, valve 46, conduit 48, exchanger 29, conduit 50 and into separator 52. In separator 52 any condensables are separated and hydrogen-containing gas is bled off through conduits 54 and valve 56. The startup gas is recycled through conduit 58, valve 60, conduit 62, valve 64, compressor 66 and conduit 68 back into the input conduit 28 as heretofore described. This operation is continued until all of the hydrogen has been removed from the system. By the employment of the compressors 26 and 66 the system is then pressured up with the CO- and hydrogen-free fuel gas until the reactor has reached substantially operating conditions. As soon as the bed temperatures are above the condensing point for the hydrogenated product recycle material the recycle liquid is introduced from the separator 52 (or from storage) through conduit 70, valve 72, conduit 74, conduit 76, valve 80 and conduit 82 into the input conduit 28. With the recycle liquid circulating throughout the system the temperature control is relatively easy and rapid and there is no longer any need for the passage of the CO- and hydrogen-free gas from conduit 18. Accordingly, valve 20 is closed. Then a CO-free hydrogen is introduced into the system and passed through the reactor through conduit 84, valve 86, compressor 26 and into the input conduit 28. This hydrogen sweeps the fuel gas from the hydrogenation reactor. As soon as the CO- and hydrogen-free fuel gas is purged from the system, the benzene feed is introduced through conduit 88, valve 90 into input conduit 28. Hydrogen is continuously recycled from the gas phase of separator 52 through conduit 58, valve 60, conduit 62, compressor 66, and conduit 68 into input feed conduit 28 along with the benzene feed and the hydrogen introduced through conduit 18. Product is recycled by way of conduit 82.

By the employment of the method of this invention the critical period from the initiation of the hydrogenation liquid recycle until sufficient recycle flow is established is adjusted so as to assure temperature control of the reaction beds. The use of the hydrogen-free gas during the startup completely eliminates the possibility that demethylation reaction taking place, since for the demethylation reaction to take place hydrogen is required.

A more comprehensive understanding of the invention can be obtained by referring to the following illustrative example which is not intended however to be unduly limitative on the invention.

*Specific Example*

An impure hydrogen stream containing demethylizable hydrocarbons obtained as an off-gas from catalytic reformer operation is utilized without steam to activate a fixed bed of fresh nickel-kieselguhr catalyst according to the process flow shown in the drawing. The activation temperature in the reactor 12 is maintained between a reduction temperature of about 650° F. and about 725° F.

The bed is then cooled with the reducing gas to about 300° F. and depressured (further cooling to below about 250° F.) to remove a major portion of the hydrogen. The remainder of the hydrogen is then removed from the system with the CO- and hydrogen-free fuel gas containing about 98 percent methane and about 2 percent of ethane. The system is then pressured up to a pressure of about 190 p.s.i.g. and a temperature of about 350° F. with the fuel gas. As soon as the bed temperature reaches 350° F. the recycle hydrogenated product is recirculated through conduit 82 from the separator 52. When the temperature has been maintained at 360° F. the fuel gas is discontinued and the fuel gas is swept from the system by the introduction of hydrogen through conduit 84. As soon as the fuel gas is purged, benzene is introduced through conduit 88.

TYPICAL CHRONOLOGY OF OPERATION

Reactor size, cu. ft./reactor _____ 795
Number of reactors, in series _____ 2

8:00 a.m.:
Add fuel gas comprising 98 percent methane, 2 percent ethane at the rate of 12,000 standard cubic feet per hour.

8:30 a.m.:
Residual hydrogen has been forced from the system.

9:00 a.m.:
Recycle hydrogen compressor is started to effect flue gas recycle and reactor bed is brought to 350° F. at 180–200 p.s.i.g. (This temperature is held between 330° F. and 430° F. The lower temperature assures minmium liquid hydrocarbon in the bed when cyclohexane is started. 430° F. is below cracking temperature. The preferred range is 360–410° F.)

10:30 a.m.:
The system is pressured up with additional fuel gas by way of the makeup hydrogen compressor at the rate of 8,000 standard cubic feed per minute to 180–200 p.s.i.g. (The bleed is still operating during this period.)

2:30 p.m.:
Cyclohexane recycle is started at the rate of 300 barrels per hour with the reactor at 360° F. (average) and 180–200 p.s.i.g. [This is the temperature after one hour (at 3:30 p.m.)]

3:30 p.m.:
The fuel gas is cut out and the hydrogen stream started at the rate of 42,000 standard cubic feet per hour.

5:00 p.m.:
The fuel gas has been flushed (by way of the bleed) from the system, and benzene is added at the rate of total flow of 420 barrels per hour (comprising 4.2 volume percent benzene).

While certain examples, structures, composition and process steps have been described for purposes of illustration the invention is not limited to these. Variation and modification within the scope of the disclosure and the claims can readily be effected by those skilled in the art.

I claim:

1. A process for hydrogenating a hydrogenatable material with a metal hydrogenation catalyst which has been reduced in a reaction zone with a hydrogen-containing gas comprising removing said hydrogen-containing gas from said reaction zone and establishing hydrogenation conditions of temperature and pressure within said reaction zone in the absence of hydrogen, the temperature for said hydrogenation conditions being less than the temperature required for the reduction of said hydrogenation catalyst, thereafter introducing hydrogen and hydrogenatable material thereto and recovering therefrom a hydrogenated product.

2. A process for hydrogenating a hydrogenatable material with a metal hydrogenation catalyst which has been reduced in a reaction zone with a hydrogen-containing gas comprising discontinuing introduction of hydrogen-containing gas into said reaction zone, removing the hydrogen from said reactor by passing therethrough a hydrogen-free gas inactive for demethylation of hydrocarbons over said catalyst so as to lower the temperature in said zone to below the temperature required to establish hydrogenation conditions, discontinuing the introduction of said hydrogen-free gas, removing said hydrogen-free gas from said zone, and raising the temperature and pressure within said reactor to hydrogenation conditions, the temperature for said hydrogenation conditions being less than the temperature required for the reduction of said hydrogenation catalyst, introducing thereto hydrogen and said hydrogenatable material and recovering therefrom a hydrogenated product.

3. The process of claim 1 wherein hydrogen-free is also CO-free.

4. A process for hydrogenating a hydrogenatable unsaturated aromatic hydrocarbon with a supported nickel hydrogenation catalyst which has been activated in situ by reduction with a reducing atmosphere of hydrogen comprising removing said hydrogen from the reactor by passing therethrough a CO- and hydrogen-free gas so as to lower the temperature in said zone to below the temperature required to establish hydrogenation conditions, increasing the pressure and temperature in said reactor with said gas, establishing temperature and pressure conditions suitable for hydrogenation within said reactor, the temperature suitable for said hydrogenation being less than the temperature required for the reduction of said hydrogenation catalyst, introducing hydrogen thereto and discontinuing the introduction of CO- and hydrogen-free gas, introducing said hydrogenatable hydrocarbon to said reactor and recovering a hydrogenated product.

5. The process of claim 3 wherein said gas comprises a CO- and hydrogen-free fuel gas comprising substantially methane.

6. The process of claim 3 wherein said gas is a saturated aliphatic carbon have from 2 to 5 carbon atoms per molecule.

7. The process of claim 3 wherein said gas comprises nitrogen.

8. A process for hydrogenating a hydrogenatable aromatic hydrocarbon with a supported nickel hydrogenation catalyst which has been activated in situ by reduction with a reducing atmosphere of hydrogen comprising removing said hydrogen from the reactor by passing therethrogh a CO- and hydrogen-free gas so as to lower the temperature in said zone to below the temperature required to establish hydrogenation conditions, increasing the pressure and temperature in said reactor with said gas, introducing thereto recycle hydrogenation product and establishing temperature and pressure conditions suitable for hydrogenation within said reactor, the temperature suitable for said hydrogenation being less than the temperature required for the reduction of said hydrogenation catalyst, purging said gas from said system by discontinuing the introduction of said gas and passing hydrogen therethrough, introducing said aromatic hydrocarbon to said reaction zone and recovering a hydrogenated product.

9. A process for hydrogenating benzene with a nickel-kieselguhr hydrogenation catalyst which has been activated in situ by reduction at a temperature in the range of 500 to 750° F. with a CO-free hydrogen containing gas passing through the bed of catalyst in the reaction zone comprising cooling the bed of catalyst with the reducing gas to a temperature in the range of about 200 to 300° F., discontinuing introduction of said reducing gas, depressuring said reaction zone thereby removing substantially all the hydrogen therefrom, purging the zone of remaining hydrogen by passing therethrough a CO- and hydrogen-free fuel gas comprising substantially methane, increasing the temperature and pressure of said zone to hydrogenation conditions with said fuel gas, introducing recycle hydrogenation product to said zone, discontinuing the introduction of fuel gas thereto, purging said zone of said fuel gas by passing a hydrogen-containing gas through said zone, introducing benzene to said zone in the presence of hydrogen and recovering a hydrogenation product therefrom.

References Cited by the Examiner

UNITED STATES PATENTS

| 2,952,519 | 9/1960 | Bercik et al. | 208—216 |
| 3,130,240 | 4/1964 | Stark | 260—667 |

DELBERT E. GANTZ, *Primary Examiner.*

S. P. JONES, *Assistant Examiner.*